(12) United States Patent
Kitahara

(10) Patent No.: US 7,876,070 B2
(45) Date of Patent: Jan. 25, 2011

(54) ELECTRONIC TIMEPIECE WITH GENERATOR FUNCTION

(75) Inventor: Joji Kitahara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 346 days.

(21) Appl. No.: 12/061,443

(22) Filed: Apr. 2, 2008

(65) Prior Publication Data

US 2008/0246437 A1 Oct. 9, 2008

(30) Foreign Application Priority Data

Apr. 3, 2007 (JP) ............................. 2007-097529

(51) Int. Cl.
*H02J 7/00* (2006.01)
*H02J 7/04* (2006.01)
*H02J 7/16* (2006.01)
*G04B 9/00* (2006.01)
*G04B 1/00* (2006.01)

(52) U.S. Cl. ...................... 320/134; 320/136; 320/152; 368/66; 368/204

(58) Field of Classification Search .................. 368/204
See application file for complete search history.

(56) References Cited

U.S. PATENT DOCUMENTS 4,240,021 A * 12/1980 Kashima et al. ............. 320/101
5,581,519 A * 12/1996 Hara et al. .................... 368/64
5,751,133 A    5/1998 Sato et al.
6,061,304 A    5/2000 Nagata et al.
6,584,043 B1 * 6/2003 Koike et al. ................. 368/204
7,327,638 B2 * 2/2008 Nagata ........................ 368/64
2001/0028606 A1* 10/2001 Fujisawa .................... 368/204

FOREIGN PATENT DOCUMENTS

| EP | 1055981 A1 | 11/2000 |
|----|------------|---------|
| EP | 1093203 A1 | 4/2001 |
| JP | 07-306274 | 11/1995 |
| JP | 09-171086 | 6/1997 |
| JP | 11-150988 | 6/1999 |

* cited by examiner

*Primary Examiner*—Edward Tso
*Assistant Examiner*—Ahmed Omar

(57) ABSTRACT

An electronic timepiece with a generator function according to a first aspect of the invention has a generator, a storage unit that stores electrical energy produced by the generator, a timekeeping controller that is driven by the electrical energy stored in the storage unit, a time display that is controlled by the timekeeping controller and displays time, a voltage detector that detects the voltage of the storage unit, and a discharge unit that discharges the charge stored in the storage unit when the voltage of the storage unit detected by the voltage detector reaches a preset first setting.

6 Claims, 11 Drawing Sheets

ELECTRONIC TIMEPIECE WITH GENERATOR FUNCTION

CROSS-REFERENCE TO RELATED APPLICATIONS

Japanese Patent application No. 2007-097529 is hereby incorporated by reference in its entirety.

BACKGROUND

1. Field of Invention

The present invention relates to an electronic timepiece with a power generator function.

2. Description of Related Art

Replacing the battery is not necessary with timepieces that have a power generator function, and such timepieces have therefore come into widespread use.

Electronic timepieces with a power generator function generally have an overcharge protection circuit. See, for example, Japanese Unexamined Patent Appl. Pub. JP-A-H09-171086.

The overcharge protection circuit is set to operate when a relatively high voltage is reached so that the secondary battery can be used to the maximum rated capacity. Using a secondary battery (lithium ion battery) with a discharge characteristic as shown in FIG. 9, for example, the overcharge protection circuit is set to operate when the voltage goes to 2.2 V in order to prevent overcharging the secondary battery.

During rapid charging when the generator current output is relatively high, the voltage also rises due to the internal resistance of the secondary battery as shown in FIG. 10. As shown in FIG. 10 for a secondary battery with a 100-Ω internal resistance, there is an apparent voltage rise of 0.3 V when a 3 mA charge current is applied during rapid charging. Even considering this voltage rise, the operating voltage of the overcharge protection circuit is preferably set to a high voltage (such as approximately 2.2 V).

Because the internal resistance of a secondary battery rises as the battery capacity decreases, the apparent voltage rise may be even greater depending upon the type of secondary battery. For example, if the secondary battery has an internal resistance of 200Ω, for example, the apparent voltage rise increases to 0.6 V as shown in FIG. 11.

The internal resistance of a secondary battery also changes with temperature and over time, and an overcharge protection circuit is especially necessary when the secondary battery has been used for some number of years because the rise in the internal resistance is particularly great. As shown in FIG. 12, for example, the apparent voltage rise is extremely high when the secondary battery shown in FIG. 11 has been used for eight years.

Motor drive stability is also affected in an analog electronic timepiece having a stepping motor and hands if the power supply voltage fluctuates greatly due to the generator output, and it is therefore necessary to reduce fluctuation in the power supply voltage and restrict the operating voltage range in order to keep the motor operating stably. See, for example, Japanese Unexamined Patent Appl. Pub. JP-A-H11-150988.

Driving the motor in a high voltage range near the overcharge protection voltage also requires complex technology in order to assure sufficient quality (see Japanese Unexamined Patent Appl. Pub. JP-A-H07-306274) and keep the drive voltage of the motor low.

While overcharging the secondary battery can be prevented by providing an overcharge protection circuit as described above, additional complex technology is required in order to stabilize motor drive if the secondary battery voltage rises to a high voltage near the operating voltage (such as 2.2 V) of the overcharge protection circuit.

Furthermore, because the secondary battery voltage can rise to near the operating voltage (such as 2.2 V) of the overcharge protection circuit, the fluctuation range of the power supply voltage increases and stable motor drive cannot be assured.

Furthermore, in a digital timepiece that displays the time using a liquid crystal display, for example, the fluctuation range of the power supply voltage is preferably as small as possible in order to enable stable operation of the driven load, including the LCD.

While rapid charging by means of the manual charging operation of the user is possible when the rotor of the generator is driven by a rotary pendulum or crown to produce power, if the apparent voltage rise produced during this rapid charging triggers the overcharge protection circuit, the secondary battery will not be charged even through the user continues the charging operation, and the battery will not be charged as expected.

In addition, if the apparent voltage rise causes the overcharge protection circuit to operate while the generator is producing power in a timepiece that has a function for displaying the generator output in real time by detecting the charge current input to the secondary battery, the power generation display function will stop because the charge current to the secondary battery is interrupted and generator output is therefore determined to have stopped. As a result, the user may mistakenly think that the generator or the power generation display function has failed or malfunctioned.

SUMMARY OF INVENTION

An electronic timepiece with a generator function according to a first aspect of the invention enables easily stabilizing driving a load such as a motor or display.

An electronic timepiece with a generator function according to a second aspect of the invention that also has an overcharge protection circuit prevents the overcharge protection circuit from operating due to an apparent voltage rise so that the battery can be sufficiently charged, and enables the power generation display function to operate normally if the timepiece also has a power generation display function.

An electronic timepiece with a generator function according to a first aspect of the invention has a generator, a storage unit that stores electrical energy produced by the generator, a timekeeping controller that is driven by the electrical energy stored in the storage unit, a time display that is controlled by the timekeeping controller and displays time, a voltage detector that detects the voltage of the storage unit, and a discharge unit that discharges the charge stored in the storage unit when the voltage of the storage unit detected by the voltage detector reaches a preset first setting.

When the voltage of the storage unit reaches a preset first setting, the discharge unit discharges part of the charge from the storage unit and thereby suppresses the voltage rise in the storage unit. The voltage of the storage unit can therefore be prevented from rising above the first setting, and can reduce the voltage fluctuation accordingly. As a result, when a motor or display is driven by the voltage in the storage unit, the driven component can be driven stably.

The electronic timepiece preferably also has an overcharge protection unit that prevents the electrical energy produced by the generator being charged to the storage unit when the voltage of the storage unit detected by the voltage detector reaches a second setting that is set higher than the first setting.

When there is a momentary spike in the generated current exceeding the discharge capacity of the discharge unit, the voltage of the storage unit will rise further and the storage unit could be overcharged even if the discharge unit operates when the voltage of the storage unit reaches the first setting.

By also incorporating an overcharge protection unit, this aspect of the invention can prevent charging the storage unit when the storage unit voltage reaches a set level, and overcharging the storage unit can therefore be prevented.

The storage unit is preferably a secondary battery, and the first setting is preferably set to a voltage that is 90% to 95% of the maximum rated capacity of the secondary battery. For example, if the storage unit is a secondary battery with a discharge characteristic as shown in FIG. 9, the first setting is preferably set to 1.5 V.

The second setting is preferably set to a voltage that is higher than the first setting by an amount equal to or greater than the apparent voltage rise. For example, if the secondary battery has a discharge characteristic as shown in FIG. 9, the first setting is 1.5 V and the apparent voltage rise is 0.6 V, the second setting is 1.5 V+0.6 V=2.1 V or greater (such as 2.2 V).

With a lithium ion secondary battery, there is little voltage fluctuation and the discharge characteristic is substantially flat to 90% to 95% of the maximum rated capacity, and there is a sharp voltage rise when the battery is discharged to greater than 95%.

Therefore, if the first setting is greater than 95% of the maximum rated capacity of the secondary battery, the first setting will be set to approximately 1.7 V to 2.0 V, voltage fluctuation rises accordingly, and it becomes more difficult to drive the motor stably.

However, if the first setting is 90% to 95% of the maximum rated capacity, such as 1.5 V, voltage fluctuation is minimal and the motor can be driven stably.

Furthermore, if the second setting is set to a voltage that is higher than the first setting by an amount equal to or greater than the apparent voltage rise, the overcharge protection unit can be prevented from operating when there is a sudden spike in the charge current due to rapid charging or the internal resistance of the secondary battery increases due to a temperature change or long-term use, and there is an apparent voltage rise of approximately 0.6 V.

As a result, the overcharge protection unit will not operate and the secondary battery can be sufficiently charged when the battery is rapidly charged by the user manually driving the generator.

Furthermore, when the timepiece has a function for detecting the charge current input to the secondary battery and displaying the power generation state, the power generation display function can operate normally without the overcharge protection unit operating and the power generation display stopping.

In an electronic timepiece according to another aspect of the invention the time display has a motor drive circuit and a motor that is driven by a motor drive pulse output from this motor drive circuit, the discharge unit has a battery voltage controller that controls the motor drive circuit, and the battery voltage controller can discharge the charge stored in the storage unit by outputting the motor drive pulse at a higher energy level than during normal drive.

In this aspect of the invention the battery voltage controller, which is the discharge unit, can control the motor drive circuit and use the motor drive pulse to discharge (consume) the charge stored in the storage unit. As a result, there is no need to provide a separate special discharge circuit, the circuit design can be simplified, and the charge stored in the storage unit can be used effectively to drive the motor.

Furthermore, as described in Japanese Unexamined Patent Appl. Pub. JP-A-H11-150988, the motor drive circuit can use a motor control method that saves power by normally supplying the lowest drive pulse needed to drive the motor, but can supply an auxiliary pulse with greater effective power than the normal drive pulse to reliably start the motor when motor rotation is detected and it is determined that the normal drive pulse was unable to start the motor due to a load fluctuation, for example. In this case, the battery voltage controller can boost the drive pulse approximately to the effective power of the auxiliary pulse when discharging the storage unit. This enables reliably driving the motor and suppressing the voltage rise in the storage unit even if a load variation is imposed on the wheel train or hand driven by the motor.

In another aspect of the invention the discharge unit includes a charge discharging circuit parallel connected to the storage unit, and a battery voltage controller that controls operation of the charge discharging circuit, and the battery voltage controller can cause the charge discharging circuit to operate so that the charge stored in the storage unit passes through the charge discharging circuit and discharges.

The charge discharging circuit can be rendered using a transistor or other switch, and a discharge resistance.

When the battery voltage controller causes the charge discharging circuit to operate in this aspect of the invention, the switch turns on so that the charge stored in the storage unit flows to the charge discharging circuit. The charge that flows through the charge discharging circuit passes through the discharge resistance and is thereby discharged (consumed).

The charge discharging circuit can thus be rendered by a simple arrangement having a transistor and a resistance, and the discharge unit can be easily configured without using a complicated circuit design.

Furthermore, by providing a dedicated charge discharging circuit, the discharge capacity can be easily adjusted by setting the resistance of the discharge resistor, for example. The discharge capacity can therefore also be easily increased compared with discharging using the motor drive pulse.

In another aspect of the invention the time display has a motor drive circuit and a motor that is driven by a motor drive pulse output from this motor drive circuit, and the discharge unit includes a battery voltage controller and a charge discharging circuit parallel connected to the storage unit. The battery voltage controller controls the motor drive circuit and discharges the charge stored in the storage unit by outputting the motor drive pulse at a higher energy level than during normal drive when the voltage of the storage unit detected by the voltage detector reaches a first setting, and causes the charge discharging circuit to operate so that the charge stored in the storage unit passes through the charge discharging circuit and discharges when the storage unit voltage detected by the voltage detector reaches a third setting that is set higher than the first setting.

The third setting is set lower than the second setting. For example, if the first setting is 1.5 V and the second setting is 2.2 V, the third setting is set to approximately 1.7 V Because the first setting is also lower than the third setting, the energy of the motor drive pulse is first increased to discharge the battery when the voltage of the storage unit rises due to power generation. The discharged charge can therefore be used effectively while suppressing the voltage rise in the storage unit.

Furthermore, if generator output exceeds the charge discharging capacity of the motor drive pulse and the voltage of the storage unit rises to the third setting, the charge discharging circuit operates to discharge the storage unit, and the storage unit can therefore be discharged more efficiently.

If the charge discharging circuit is operating because the third setting was detected, the charge discharging process using the motor drive pulse can be executed simultaneously. If both discharge modes are used, the charge discharging capacity is greater than if only the charge discharging circuit is used.

Further preferably, the discharge unit increases the discharge level as the voltage of the storage unit rises when the voltage of the storage unit detected by the voltage detector is greater than or equal to a first setting.

For example, the voltage at which the discharge unit operates can be set in multiple stages from the first setting, and the discharge level of the discharge unit at each stage can be increased as the voltage rises.

Because this aspect of the invention increases the discharged charge as the voltage of the storage unit rises, the storage unit can be charged more effectively during rapid power generation, and the voltage of the storage unit can be effectively prevented from rising.

An electronic timepiece according to another aspect of the invention preferably also has a power generation detector that detects the generation state of the generator, and a power generation display that displays the power generation state based on a detection result from the power generation detector.

The power generation detector can detect the power generation state by detecting the charge current input to the storage unit. The power generation display can indicate the detected power generation state, such as the charge current level, using a display hand. The user can therefore easily confirm the current power generation state. In addition, because this aspect of the invention has a discharge unit, the overcharge protection unit can be prevented from operating and the power generation state thus not being normally displayed, and the power generation display function can therefore operate normally.

An electronic timepiece with a generator function according to the invention can easily stabilize driving a load such as a motor or display. If the timepiece has an overcharge protection circuit, the overcharge protection circuit is prevented from operating due to an apparent voltage rise so that the battery can be sufficiently charged. If the timepiece also has a power generation display function, the power generation display function can operate normally.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

General Configuration of an Electronic Timepiece

Figure 1:
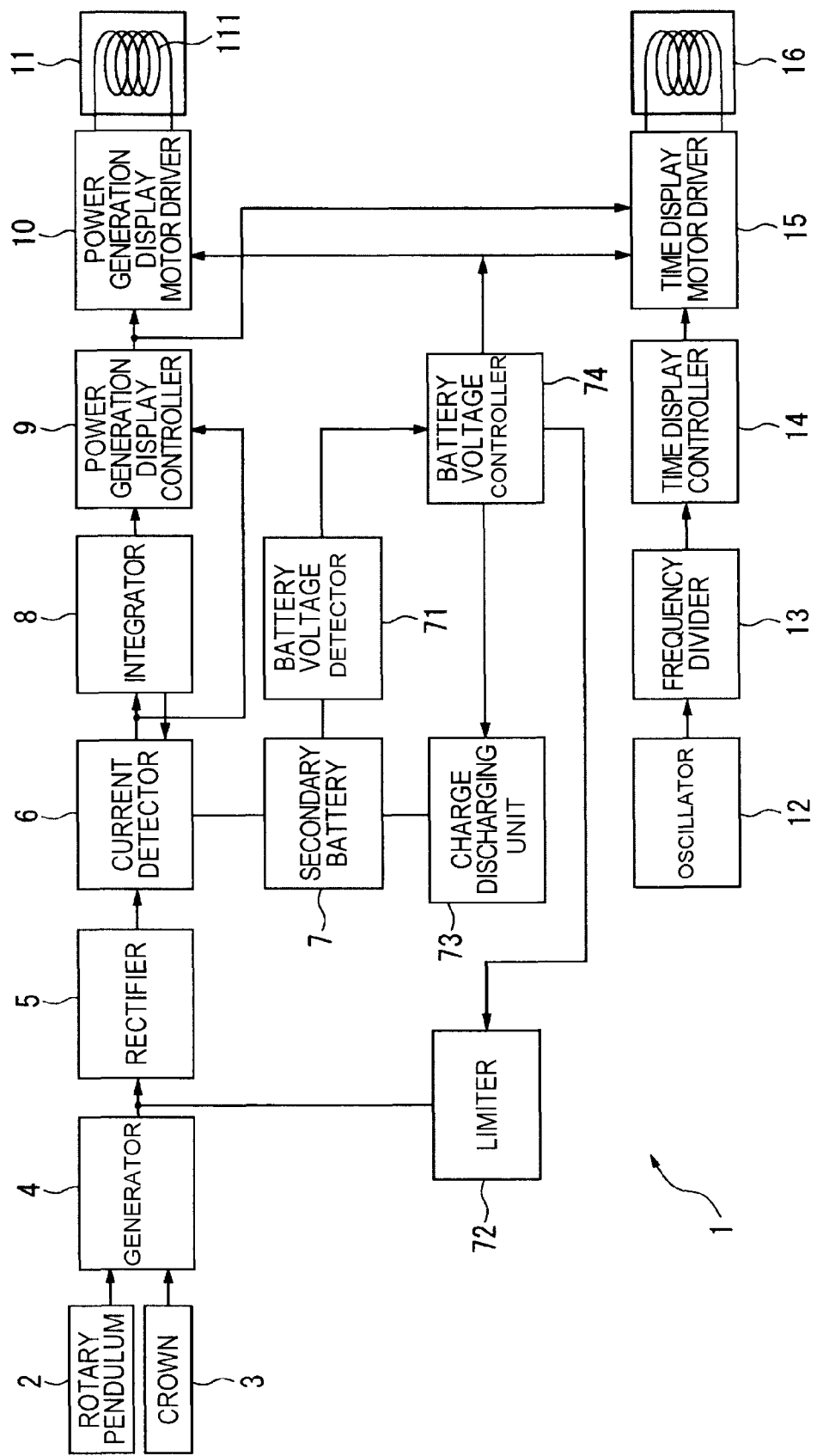
FIG. 1 is a block diagram of an electronic timepiece with a generator function according to a preferred embodiment of the present invention.

As shown in FIG. 1, an electronic timepiece 1 according to the present invention has a rotary pendulum 2, a crown 3, a generator 4, a rectifier 5, a current detector 6, a secondary battery 7 as a power storage unit, an integrator 8, a power generation display controller 9, a power generation display motor driver 10, a power generation display motor 11, an oscillator 12, a frequency divider 13, a time display controller 14, a time display motor driver 15, and a time display motor 16.

The electronic timepiece 1 also has a battery voltage detector 71 that detects the battery voltage of the secondary battery 7, a limiter 72 as a charging controller that controls charging the secondary battery 7, a charge discharger 73 that discharges a charge stored to the secondary battery 7, and a battery voltage controller 74 that controls the voltage of the secondary battery 7.

Figure 2:
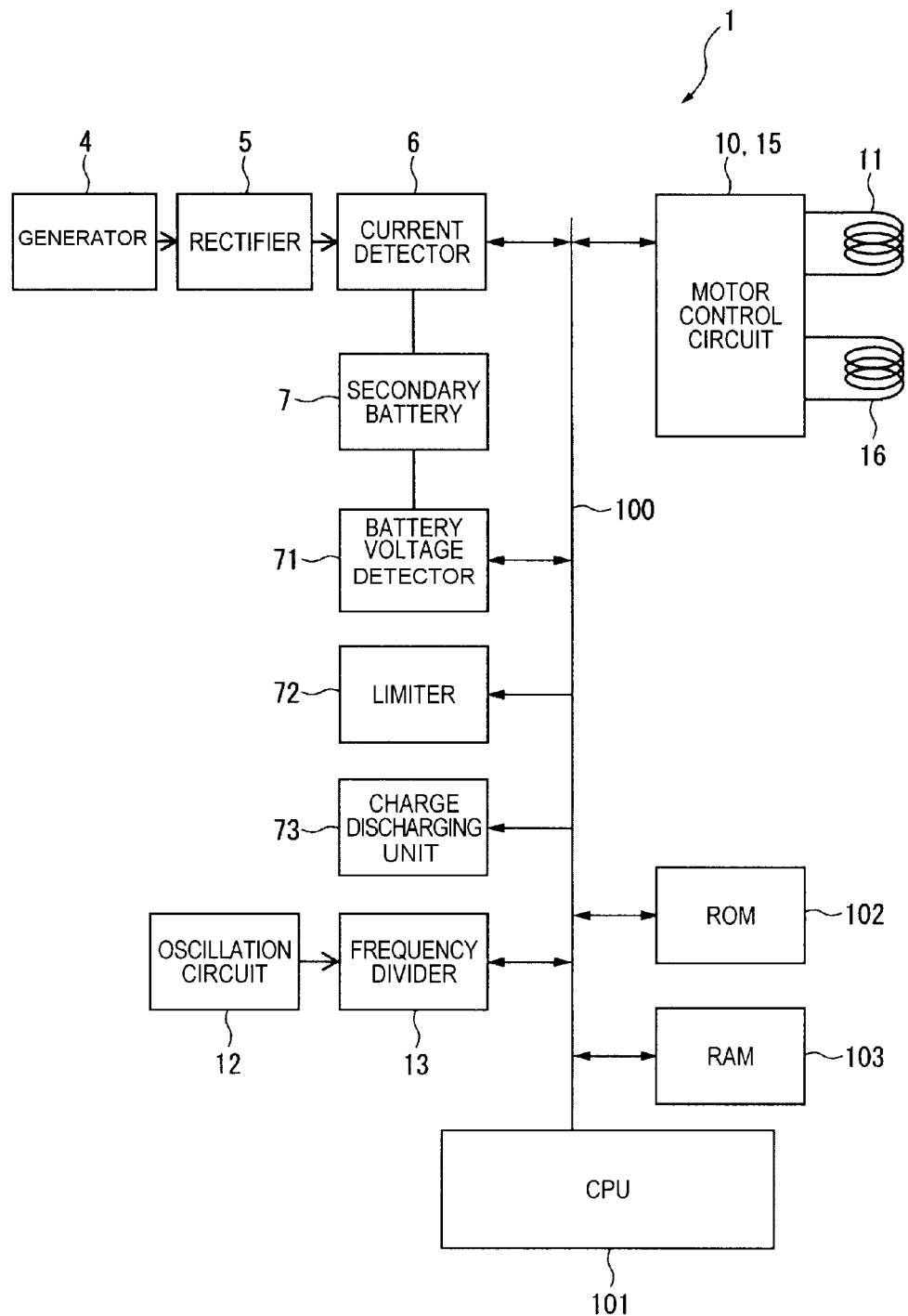
FIG. 2 is a circuit block diagram of the electronic timepiece in the preferred embodiment of the invention.

As shown in the hardware schematic in FIG. 2, the current detector 6 (current detection circuit), the frequency divider 13 (frequency division circuit), the motor driver 10 and 15 (motor control circuits), the battery voltage detector 71 (battery voltage detection circuit), the limiter 72, and the charge discharger 73 are connected to a CPU 101 (central processing unit), ROM 102 (read-only memory), and RAM 103 (random access memory) by a bus 100 to enable data input and output therebetween.

In this embodiment of the invention the integrator 8, the power generation display controller 9, the time display controller 14, and the battery voltage controller 74 are achieved by running specific software applications using the CPU 101, ROM 102, and RAM 103.

Figure 3:
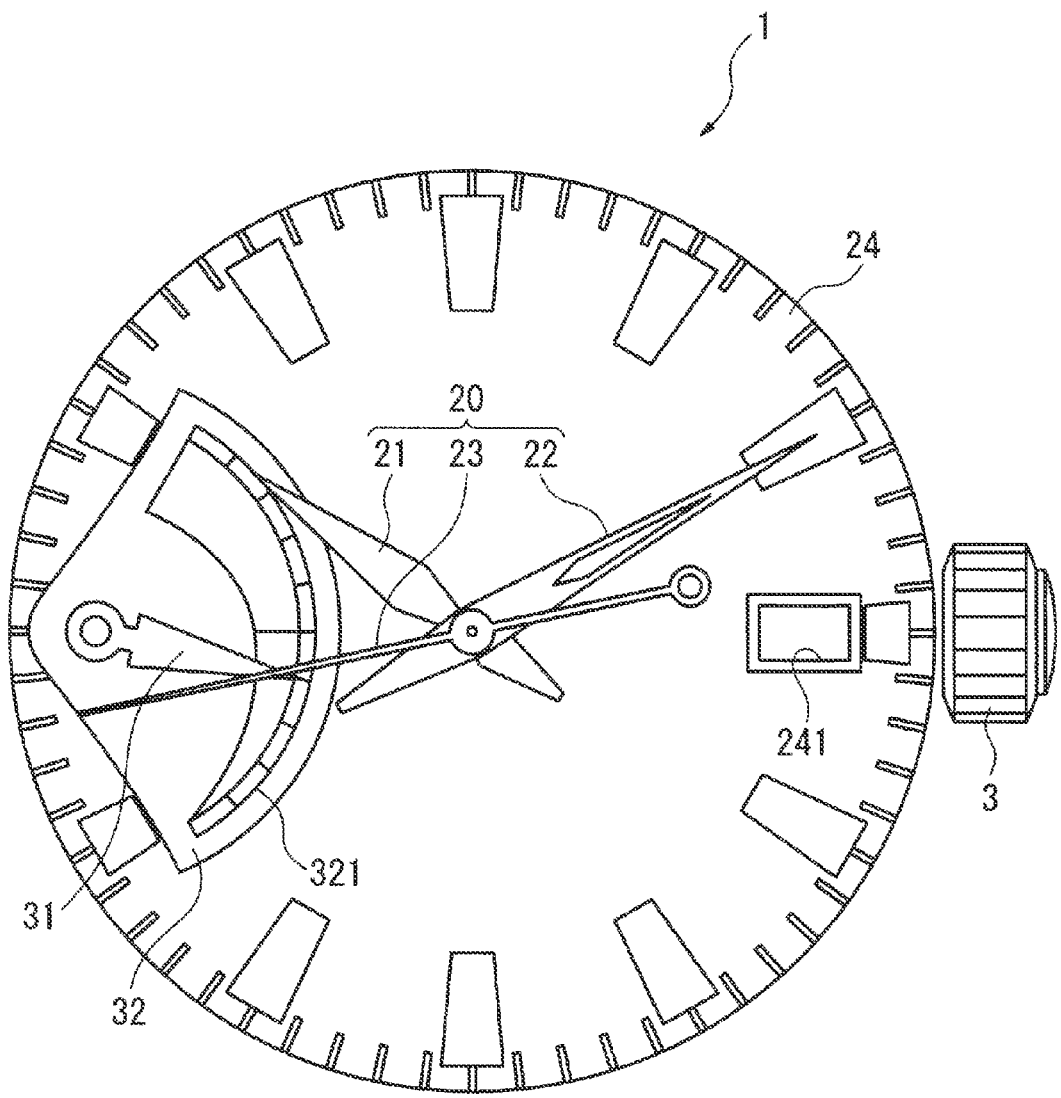
FIG. 3 shows the dial portion of the electronic timepiece in the preferred embodiment of the invention.

As shown in FIG. 3, the electronic timepiece 1 has hands 20 including an hour hand 21, a minute hand 22, and a second hand 23 for indicating the time. The hands 20 are driven by the time display motor 16.

A power generation dial 32 and a display hand (auxiliary hand) 31 that is separate from the hands 20 for indicating the time and is used to indicate power generation are disposed at the 9:00 o'clock position on the dial 24 of the electronic timepiece 1. The display hand 31 is driven by the power generation display motor 11.

A window 241 is formed at the 3:00 o'clock position of the dial 24, and the date can be displayed by a date wheel disposed behind the dial 24. The date wheel is driven rotationally by a date wheel motor not shown.

In the electronic timepiece 1 thus comprised the timepiece controller of the invention is rendered by the oscillator 12, the frequency divider 13, and the time display controller 14, and the time display is rendered by the time display motor driver 15, the time display motor 16, and the hands 20.

The power generation detector of the invention is rendered by the current detector 6 and the integrator 8. The power generation display is rendered by the power generation display controller 9, the power generation display motor driver 10, the power generation display motor 11, the display hand 31, and the power generation dial 32. The hand of the power generation display is rendered by the display hand 31, and the actuator is rendered by the power generation display motor driver 10 and the power generation display motor 11.

The generation level detection unit that determines if the detected generator output current is greater than or equal to a specific threshold level, and a drive control unit that controls driving the display hand 31, are rendered as functions of the power generation display controller 9, and in this embodiment of the invention the generation level detection unit and the drive control unit are rendered by the power generation display controller 9.

Power Generator

Figure 4:
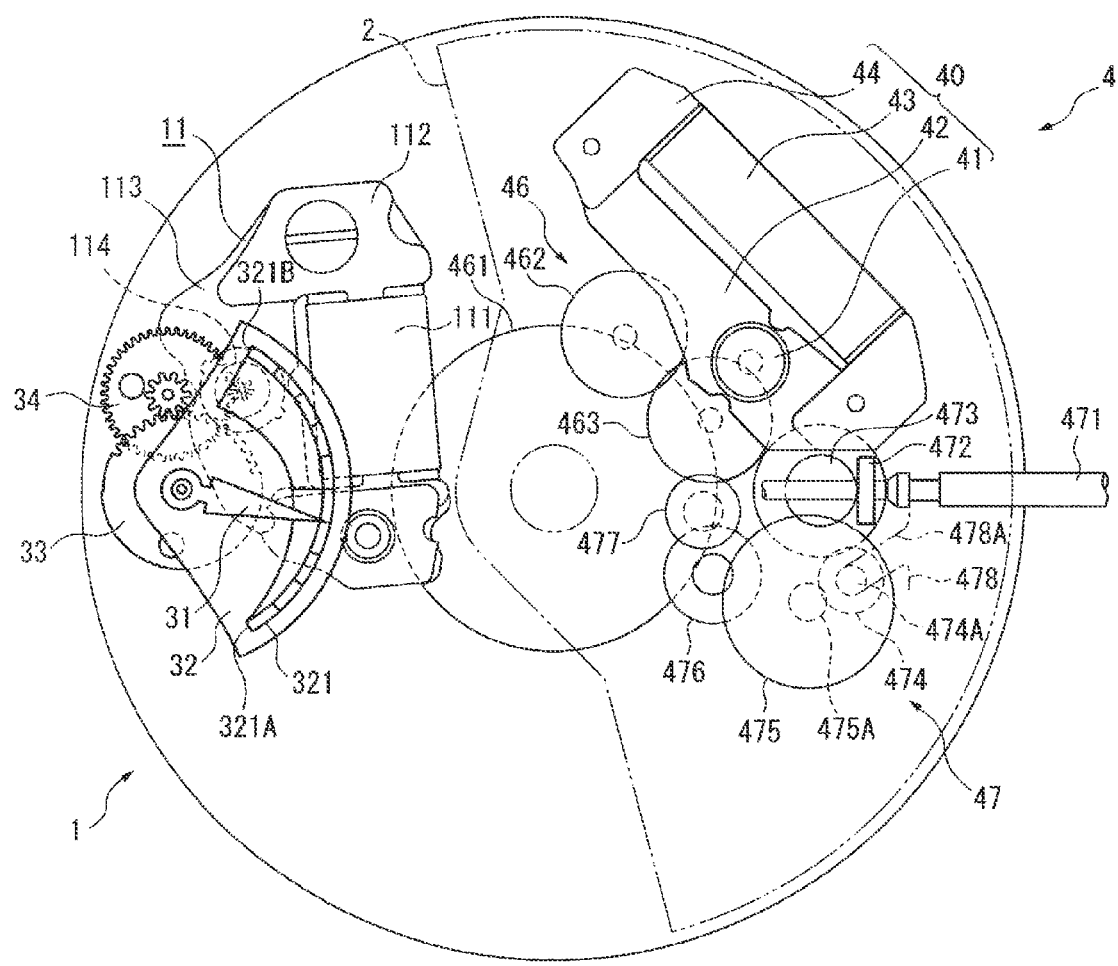
FIG. 4 shows the arrangement of the generator and the power generation display in the preferred embodiment of the invention.

As shown in FIG. 4, the generator 4 enables generating power using a self-winding generator that is driven by the rotary pendulum 2 disposed inside the case of the electronic timepiece 1, or using a manually wound generator that is driven by the crown 3.

More specifically, the generator 4 includes a generator 40, a self-winding transfer unit 46, and a manual winding transfer unit 47. The self-winding transfer unit 46 transfers mechanical energy from the rotary pendulum 2 to the generator 40. The manual winding transfer unit 47 transfers mechanical energy from the crown 3 to the generator 40.

The generator 40 is a common alternating current generator including a rotor 41, a stator 42, a coil 43, and a coil block 44. The rotor 41 is rotatably disposed to the stator 42, and the coil 43 is wound to the coil block 44.

The self-winding transfer unit 46 includes a rotary pendulum wheel 461 that rotates in unison with the rotary pendulum 2, and a pair of switching wheels 462 and 463 to which rotation of the rotary pendulum wheel 461 is transmitted. One switching wheel 463 meshes with the pinion of the rotor 41 so that torque from the rotary pendulum 2 is transferred through the rotary pendulum wheel 461 and switching wheels 462 and 463 to the rotor 41 so that the generator 40 produces power.

The pair of switching wheels 462 and 463 have a ratchet wheel not shown so that the rotor 41 only turns in one direction regardless of which direction the rotary pendulum wheel 461 turns.

The manual winding transfer unit 47 includes a winding stem 471, a winding pinion 472, a crown wheel 473, a clutch wheel 474, a first manual winding transfer wheel 475, a second manual winding transfer wheel 476, a third manual winding transfer wheel 477, and the switching wheel 463.

The crown 3 is attached to the end of the winding stem 471 so that the winding stem 471 turns when the user turns the crown 3. Rotation of the winding stem 471 is transmitted to the clutch wheel 474 by the intervening winding pinion 472 and crown wheel 473, rotation of the clutch wheel 474 is transmitted to the first manual winding transfer wheel 475, and rotation of the first manual winding transfer wheel 475 is transmitted to the switching wheel 463 by the intervening second manual winding transfer wheel 476 and third manual winding transfer wheel 477.

The clutch wheel 474 engages the pinion 475A of the first manual winding transfer wheel 475 only when the winding stem 471 turns in one direction. More specifically, a slot 478A is formed in the bridge 478 to which the clutch wheel 474 is disposed, and the support pin 474A of the clutch wheel 474 is fit freely slidably in this slot 478A. Referring to FIG. 4, when the stem is wound and the crown wheel 473 turns clockwise, the clutch wheel 474 rotates counterclockwise while moving toward the center of the first manual winding transfer wheel 475 to engage the pinion 475A. When the first manual winding transfer wheel 475 turns counterclockwise due to drive power from the switching wheel 463, the clutch wheel 474 separates from the pinion 475A while turning clockwise and thus disengages the first manual winding transfer wheel 475. As a result, rotation of the rotary pendulum 2 is not transmitted to the winding stem 471.

Rectifier

The rectifier 5 rectifies the AC current output from the generator 40, and can be rendered using a known rectification circuit such as a full-wave rectifier circuit or a half-wave rectifier circuit.

Figure 5:
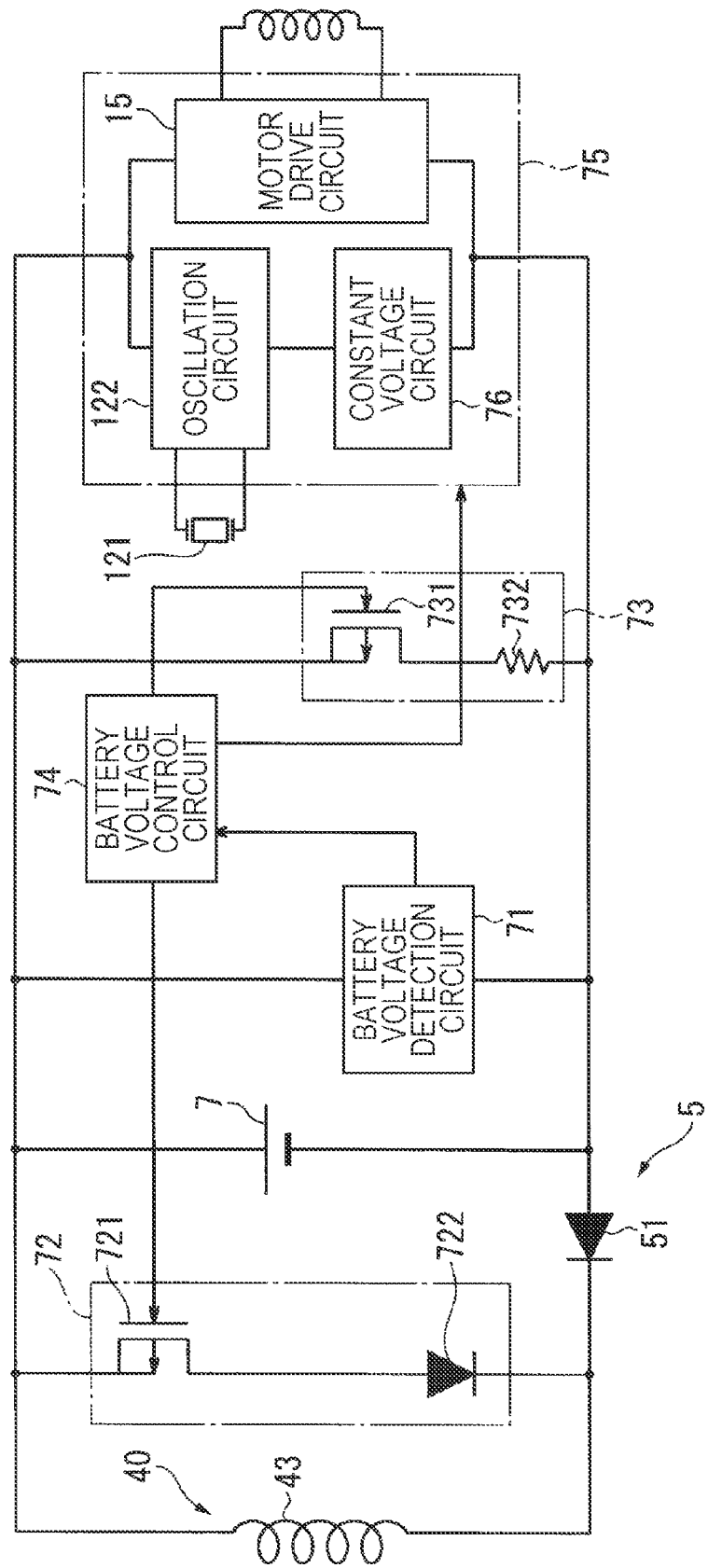
FIG. 5 is a circuit diagram of the discharge unit in the preferred embodiment of the invention.

In this embodiment of the invention the rectifier 5 is rendered by a rectification diode 51 as shown in the circuit diagram in FIG. 5.

Current Detector

The current detector 6 detects the level of the current rectified by the rectifier 5.

Figure 6:
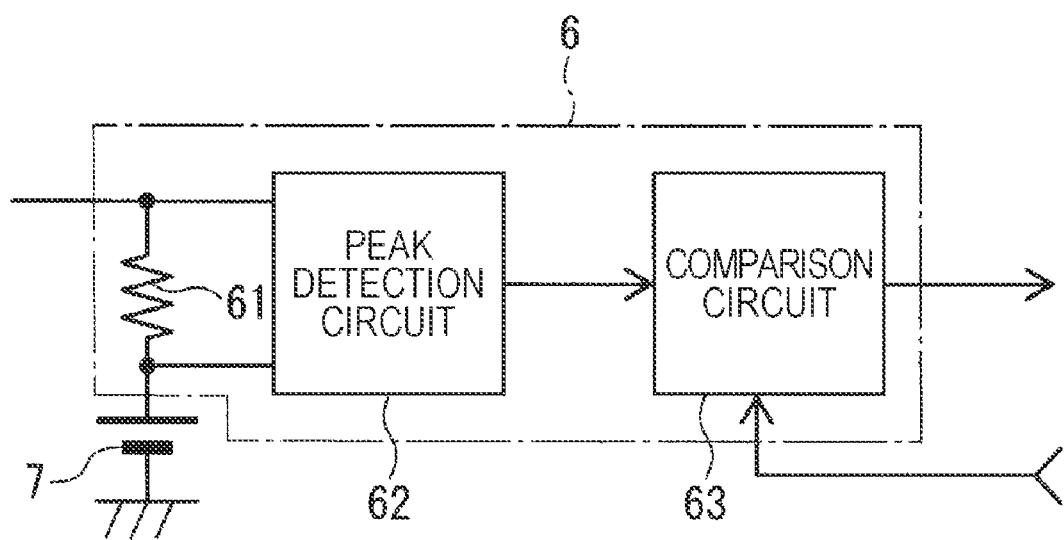
FIG. 6 is a circuit diagram of the current detector in the preferred embodiment of the invention.

More specifically, as shown in FIG. 6, the current detector 6 has a resistor 61, a peak detection circuit 62, and a comparison circuit 63. The resistor 61 is disposed between the rectifier 5 and the secondary battery 7. The peak detection circuit 62 measures the current flowing through the resistor 61 and detects the current generation peak. The comparison circuit 63 then compares the peak value detected by the peak detection circuit 62 with a threshold value.

The current detector 6 is driven at a prescribed sampling rate (sampling period) by a signal from the CPU 101 and samples the charge current charged to the secondary battery 7.

Figure 7:
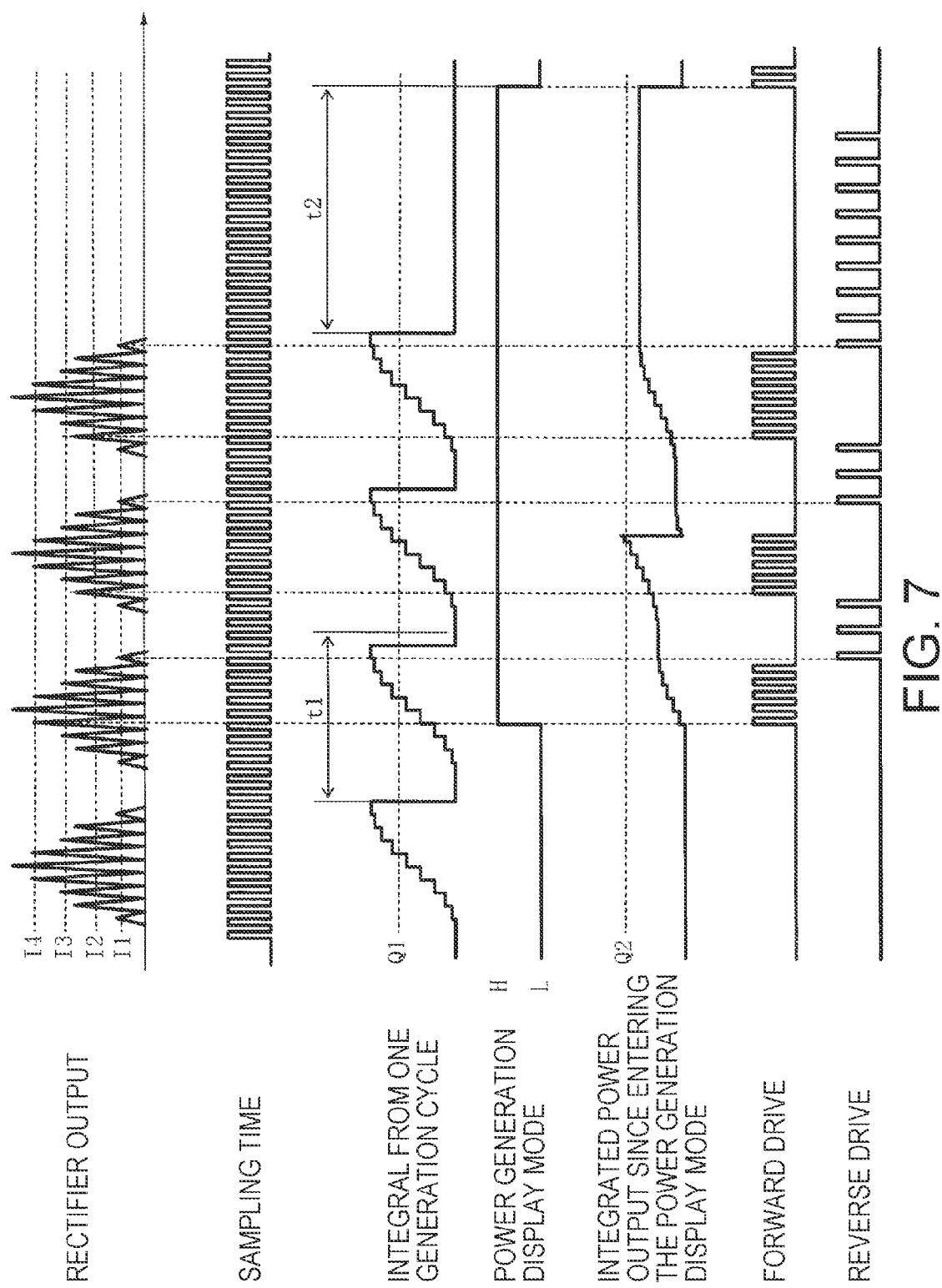
FIG. 7 is a timing chart showing the relationship between power generation, the power generation integral, and the motor drive pulse in the preferred embodiment of the invention.

As shown in FIG. 7, the peak detection circuit 62 samples the generated current output from the rectifier 5 and detects the peak value of each sample. The comparison circuit 63 compares the peak value detected by the peak detection circuit 62 with prescribed threshold values, such as threshold values I1 to I4 in FIG. 7, and outputs a detection result signal to the integrator 8 and the power generation display controller 9.

The comparison circuit 63 in this embodiment of the invention is arranged so that the threshold value level, that is, the detection level, can be changed by a signal from the CPU 101 based on the integral of the integrator 8, for example.

Power Storage Unit

Figure 9:
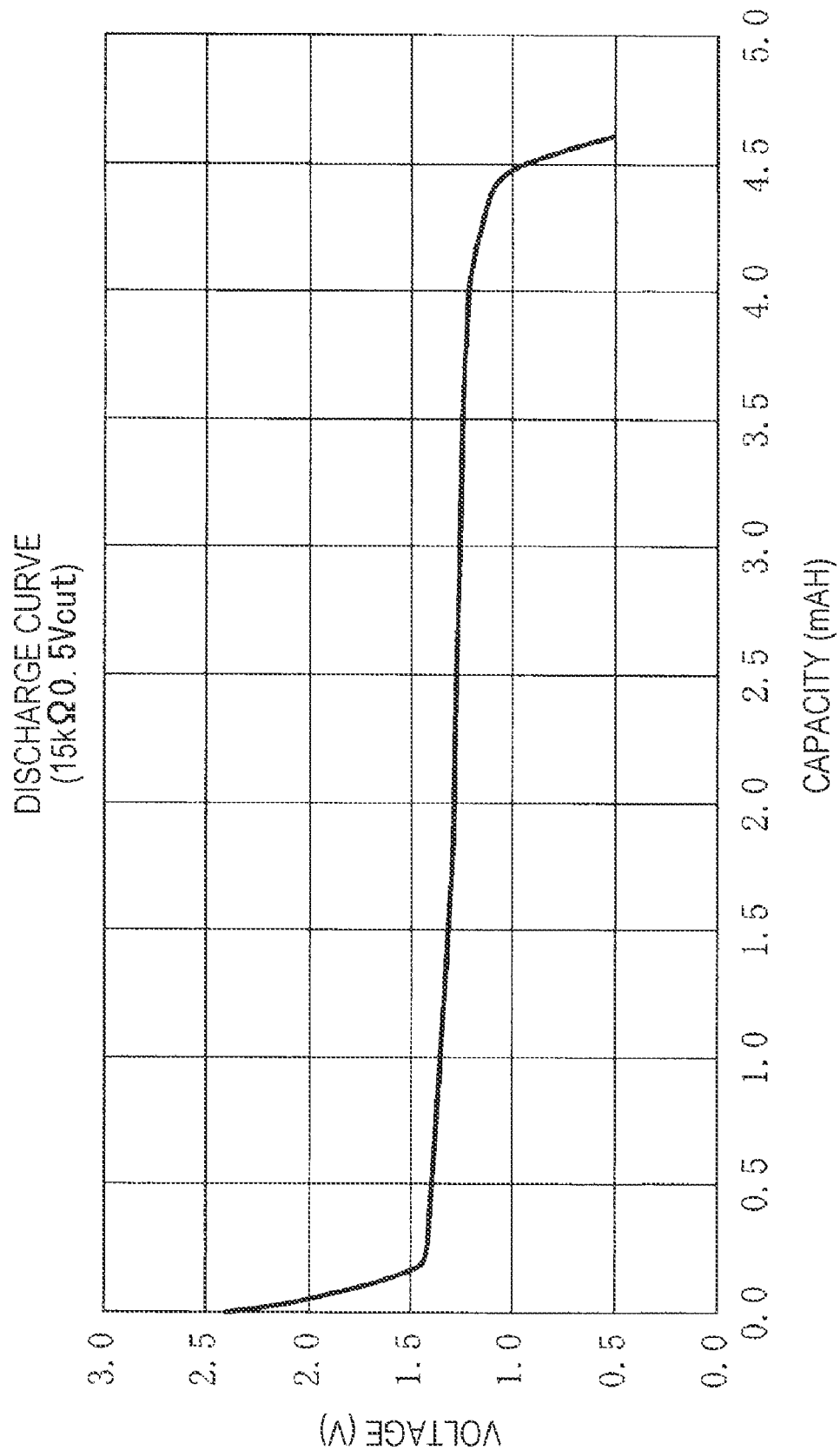
FIG. 9 is a graph of a secondary battery characteristic.
Figure 10:
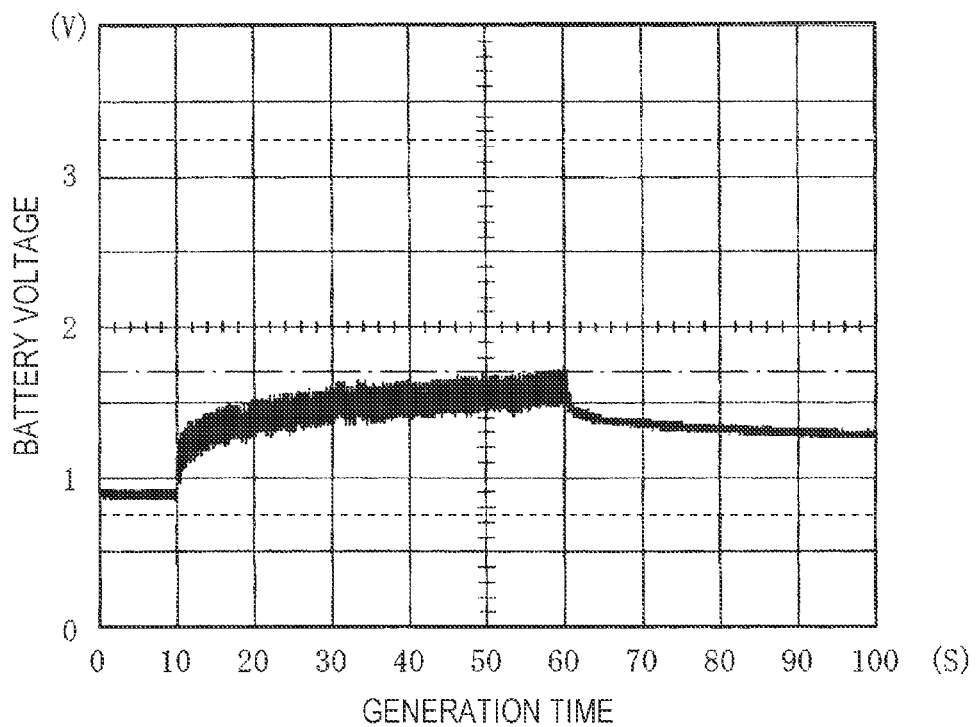
FIG. 10 is a graph of a secondary battery characteristic.
Figure 11:
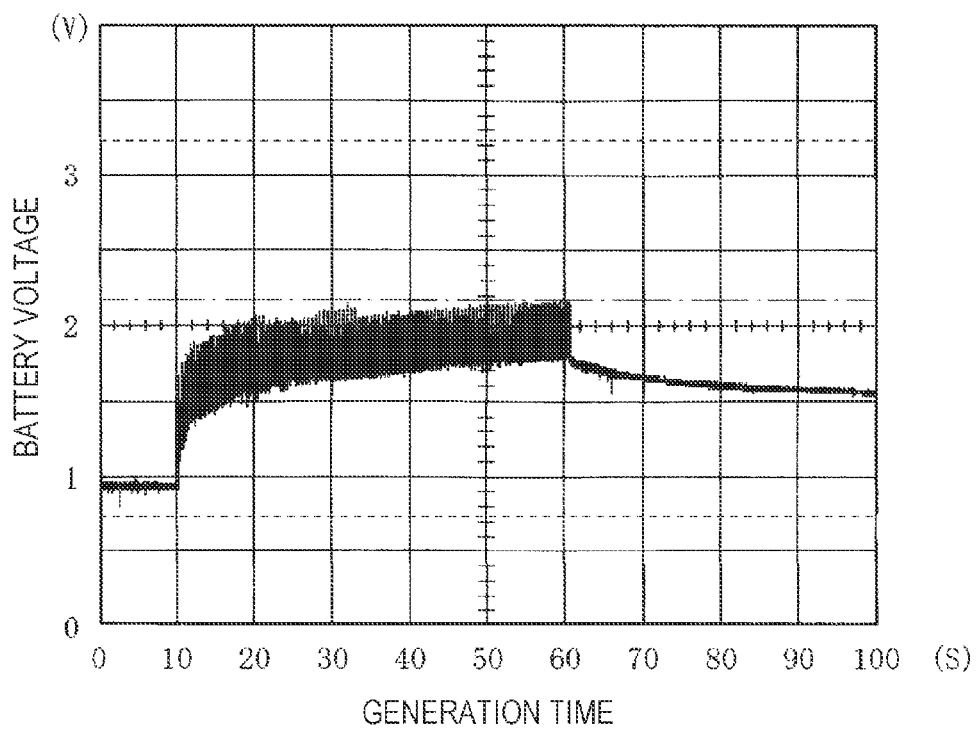
FIG. 11 is a graph of a secondary battery characteristic.
Figure 12:
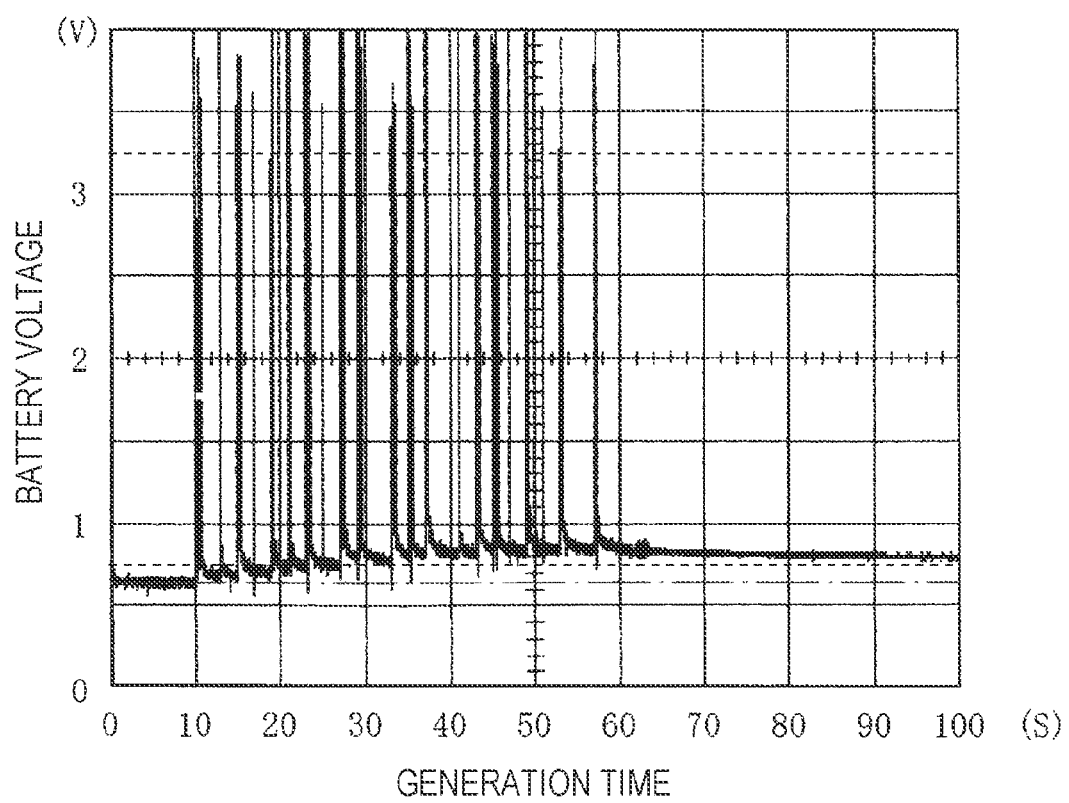
FIG. 12 is a graph of a secondary battery characteristic.

The power storage unit of the invention is rendered by a secondary battery 7 that can be charged by the current generated by the generator. The secondary battery 7 is a lithium ion battery having a discharge characteristic such as shown in FIG. 9.

Output from the generator 40 is rectified by the rectifier 5 and stored in the secondary battery 7 through the intervening current detector 6. The storage unit is not limited to a secondary battery 7, and a capacitor could be used instead.

Integrator

The integrator 8 calculates the average current based on the detection result signal output from the current detector 6, and integrates the average current values.

More specifically, the relationship between the generated current peak detected from each sample and the average current level at each peak is predetermined experimentally, and stored in a correlation table in ROM 102. The integrator 8 finds the average current level corresponding to the detection result signal (peak) output from the current detector 6, and integrates the average current values.

The integrator 8 has a power generation counter, a power generation display state counter, and a continuous operating time counter. The counters are rendered in RAM 103.

As shown in FIG. 7, the power generation counter is a counter that integrates the average current each time power is generated and stores the integral (generated power output) of the single generation cycle. As described below, this counter is provided because one condition for going to the power generation display state is whether the power output from the one generation cycle integrated by the power generation counter is greater than or equal to a threshold value Q1.

The power generation display state counter integrates and stores the average current after the power generation display mode described below. As shown in FIG. 7, the power generation display state counter is reset when the generated power output exceeds a threshold value Q2.

The continuous operating time counter counts the continuous operating time of the electronic timepiece 1, and steps up the continuous operating time that is displayed during normal operation a one-day increment each time the integral of the generated current (generated power) reaches the preset value for the amount of power to be generated in one day. When current consumption by the electronic timepiece 1 reaches the amount consumed in one day, the cumulative value stored in the continuous operating time counter is reduced, and the continuous operating time display is stepped down a one-day increment each time the continuous operating time becomes one day shorter.

These one-day amounts of power generation and current consumption can be set by measuring the current consumption of the electronic timepiece 1 and calculating power consumption per day, and setting the per-day power generation based on the measured power consumption. This can be difficult to achieve in a small electronic timepiece 1 such as a wristwatch, however, because it requires incorporating a circuit for measuring current consumption.

In this embodiment of the invention, therefore, the typical per-day current consumption of the electronic timepiece 1 is measured and calculated in the factory, and the required daily power generation corresponding to the calculated power consumption is preset and stored in ROM 102, for example. Each time the movement of the electronic timepiece 1 advances normally one day, the amount of current consumed per day is assumed to have been consumed and the continuous operating time counter is decremented one day.

When this electronic timepiece 1 is used and the process described below for discharging a charge from the secondary battery 7 is executed, the continuous operating time is corrected based on the discharged charge.

Power Generation Display Controller

The power generation display controller 9 controls the power generation display motor driver 10 based on output from the current detector 6 and the integrator 8. More specifically, during normal operation the power generation display controller 9 reads the continuous operating time counter of the integrator 8, and controls the power generation display motor driver 10 so that the display hand 31 indicates the stored count, that is, the continuous operating time.

One graduation of the power generation dial 32 in this embodiment of the invention is equal to a continuous operating time of one day. When the continuous operating time counter is stepped up as a result of generating power as described above, the power generation display motor driver 10 moves the display hand 31 one graduation counterclockwise. When power is consumed and the continuous operating time counter is decremented one step, the power generation display motor driver 10 moves the display hand 31 clockwise one graduation.

If power is generated continuously by manually winding the stem, the power generation display controller 9 switches the display hand 31 from the normal continuous operating time display to the power generation display mode. This operation is described in detail below.

Power Generation Display Motor Driver

The power generation display motor driver 10 outputs a drive pulse to the motor coil 111 of the power generation display motor 11 to control driving the power generation display motor 11 based on a drive control signal output from the power generation display controller 9.

Power Generation Display Motor and Display Hand 31 Drive Wheel Train

As shown in FIG. 4, the power generation display motor 11 has a coil block 112 to which the motor coil 111 is wound, and a stator 113 to which a rotor 114 is disposed to rotate freely.

An intermediate wheel 34 meshes with the rotor pinion of the rotor 114, and a display wheel 33 meshes with the pinion of the intermediate wheel 34. The display hand 31 is attached to the display wheel 33.

The display wheel 33 has teeth formed to only a part of the outside edge of the wheel, and can be rotated only within a prescribed angular range by the power generation display motor 11. The display hand 31 that is attached to the display wheel 33 can therefore also rotate only through a prescribed angular range.

The power generation dial 32 is a flat fan shape, and a scale 321 is formed in an arc along the path of the distal end of the display hand 31.

The scale 321 is divided into ten segments ranging from a zero graduation 321A denoting hand position 0 to a tenth graduation 321B denoting hand position 10. The scale 321 therefore has eleven index marks from hand position 0 to hand position 10, and can indicate eleven states.

When the display hand 31 is used as a continuous operating time hand indicating the remaining continuous operating time, each graduation represents a continuous operating time equal to one day, and a maximum continuous operating time of ten days can be indicated.

More specifically, when the count of the continuous operating time counter goes to 0 days, the display hand 31 points to the zero graduation 321A, and when the count goes to one day, the display hand 31 points to the first graduation. As the count thereafter increases one day, the display hand 31 points to the second to tenth graduations. If the continuous operating time is more than ten days, the display hand 31 continues pointing to the tenth graduation 321B because the scale only covers ten days.

In this embodiment of the invention the tenth graduation 321B is set as the first target position toward which the display hand 31 moves in the power generation display mode. The second target position is set to the not-generating display position, which is the position indicated by the display hand 31 when the generator is not producing power and changes according to the integral of generator output after the power generation display mode is entered as described below.

Timepiece Controller and Time Display

The timepiece controller and time display for displaying the regular time are the same as in a common analog quartz timepiece, and detailed description thereof is omitted below.

More specifically, the oscillator 12 includes a crystal oscillator 121 and an oscillation circuit 122, and outputs a signal of a prescribed frequency. The frequency divider 13 frequency divides the signal from the oscillator 12, and outputs a 1-Hz reference signal in this embodiment of the invention.

The time display controller 14 outputs a drive signal to the time display motor driver 15 based on the reference signal from the frequency divider 13. The drive signal is normally output each time the 1-Hz reference signal is output from the oscillator 12. The time display motor driver 15 inputs to the motor coil of the time display motor 16 based on the drive signal, and the time display motor 16 moves the hands 20 in steps.

A control signal from the power generation display controller 9 causes the time display motor driver 15 to enter a sleep mode that stops movement of the hands 20 when the remaining continuous operating time goes to 0.

As shown in FIG. 5, a timekeeping circuit 75 is rendered by means of the oscillator 12, the frequency divider 13, and the time display controller 14, for example, in this embodiment of the invention. The timekeeping circuit 75 also has a constant voltage circuit 76. As a result, the voltage for driving the oscillation circuit 122 and other parts can be held to a constant voltage if the voltage fluctuation of the secondary battery 7 is within a certain range.

Secondary Battery Voltage Control

The arrangement for controlling the voltage of the secondary battery 7 is described next.

The battery voltage detector 71 detects the voltage of the secondary battery 7. The battery voltage detector 71 is a common voltage detector that detects the voltage of the secondary battery 7 in substantially real time at a prescribed sampling time.

As shown in FIG. 5, the limiter 72 has a limit transistor 721 and a limit diode 722. The limit transistor 721 functions as a switch that is turned on and off by a control signal from the battery voltage controller 74 (battery voltage control circuit). When the limit transistor 721 is on, the ends of the coil 43 of the generator 40 are shorted and the generator current flows through the limiter 72, and charging the secondary battery 7 is prevented. The limiter 72 thus renders an overcharge protection unit.

The charge discharger 73 has a discharge transistor 731 and a discharge resistance 732. The discharge transistor 731 functions as a switch that is turned on and off by a control signal from the battery voltage controller 74. When the discharge transistor 731 is on, the charge charged to the secondary battery 7 flows through the charge discharger 73 and is discharged by the discharge resistance 732.

The battery voltage controller 74 controls the limiter 72, the charge discharger 73, and the motor driver 10 and 15 based on the voltage detected by the battery voltage detector 71 to control the voltage of the secondary battery 7.

The operation of the electronic timepiece 1 described above is described next with reference to the flow chart in FIG. 8.

Figure 8:
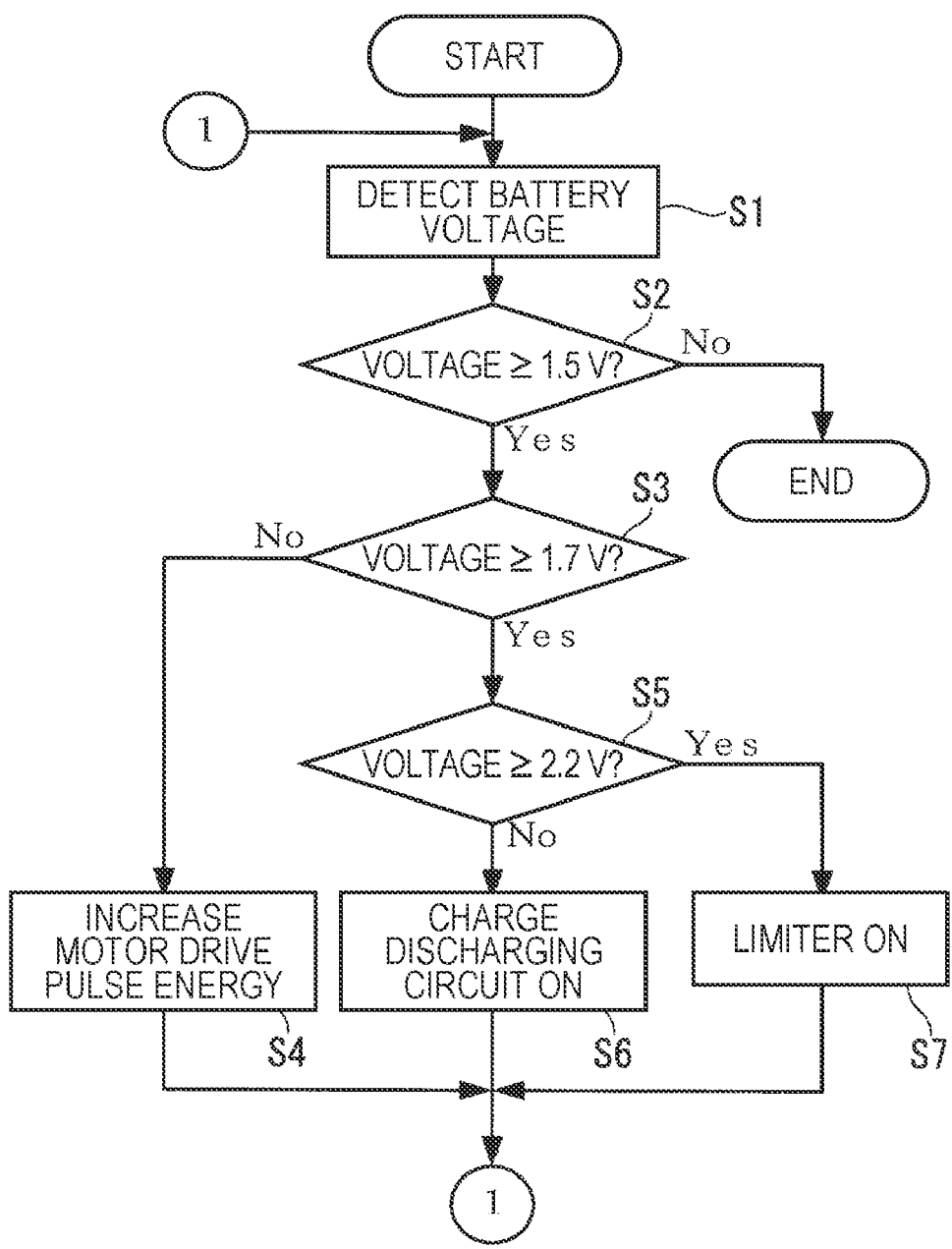
FIG. 8 is a flow chart of the battery voltage control process in the preferred embodiment of the invention.

The control process shown in the flow chart in FIG. 8 is executed at each sampling time shown in FIG. 7.

Battery Voltage Control Process

When the electronic timepiece 1 starts operating, the CPU 101 drives the battery voltage detector 71 to detect the voltage of the secondary battery 7 (step S1).

The battery voltage controller 74 determines if the detected voltage is greater than or equal to a first setting (1.5 V in this embodiment of the invention) (step S2). If the detected voltage is less than the first setting (1.5 V), there is no need to discharge voltage in order to lower the voltage of the secondary battery 7, and the battery voltage controller 74 therefore ends the battery voltage control process.

If in step S2 the detected voltage is greater than or equal to the first setting (1.5 V), the battery voltage controller 74 determines if the detected voltage is greater than or equal to a third setting (1.7 V in this embodiment of the invention) (step S3).

If the detected voltage is less than the third setting (1.7 V), that is, the detected voltage is greater than or equal to 1.5 V and less than 1.7 V, the battery voltage controller 74 controls the motor driver 10, 15 to increase the energy of the motor drive pulse (step S4). The energy level of the motor drive pulses from both of the motor driver 10, 15 can be increased in this case, or the energy level of the motor drive pulse output from only one of the motor driver can be increased.

If in step S3 the detected voltage is greater than or equal to the third setting (1.7 V), the battery voltage controller 74 determines if the detected voltage is greater than or equal to a second setting (2.2 V in this embodiment of the invention) (step S5).

If the detected voltage is less than the second setting (2.2 V), that is, the detected voltage is greater than or equal to 1.7 V and less than 2.2 V, the battery voltage controller 74 causes the charge discharger 73 to operate (step S6). More specifically, a control signal from the battery voltage controller 74 turns the discharge transistor 731 on so that current from the secondary battery 7 flows to the discharge resistance 732 and the secondary battery 7 is discharged.

However, if step S5 determines that the detected voltage is greater than or equal to the second setting (2.2 V), the battery voltage controller 74 causes the limiter 72 to operate (step S7). More specifically, a control signal from the battery voltage controller 74 turns the limit transistor 721 on to short the ends of the coil 43. As a result, the current generated by the coil 43 does not flow to the secondary battery 7 and overcharging the secondary battery 7 is prevented.

After the battery voltage controller 74 executes any of steps S4, S6, or S7, the battery voltage control process (step S1 to S7) repeats. The battery voltage control process therefore repeats until the detected voltage is less than 1.5 V in step S2, and the secondary battery 7 voltage is controlled so that it does not rise to or above 1.5 V.

Power Generation Display Control

A process for displaying the power generation state using the display hand 31 is described next.

When the power generator 4 of the electronic timepiece 1 is driven to generate power by winding the crown 3 or causing the rotary pendulum 2 to rotate, the generated current passes through the rectifier 5 and is stored in the secondary battery 7 unless the limiter 72 operates, and the charge current is detected by the current detector 6.

The current detector 6 outputs a detection result signal corresponding to the current peak of each sample, or more specifically a signal denoting the result of comparing each sample with the threshold levels I1 to I4.

The integrator 8 then integrates the detection result signal of the current detector 6. The power generation display controller 9 then determines if the display hand 31 is currently in the operating time display mode or the power generation display mode.

If the power generation display controller 9 determines that the display hand 31 is not operating in the power generation display mode, the power generation display controller 9 determines whether the conditions for switching to the power generation display mode have been met.

More specifically, if the charge current is greater than I3, power generation from the previous single winding (the amount of power generated from when the current detection result went from greater than I1 to less than I1) is greater than Q1, and the time passed since the end of the last power generation cycle (the time since the current detection result went to I1 or less) is less than or equal to predefined time t1, the power generation display controller 9 changes to the power generation display mode.

This condition prevents switching to the power generation display mode when power is generated irregularly and the amount of power produced is low, such as when power is generated unintentionally by the user by the self-winding operation of the rotary pendulum 2.

As a result, if the user turns the crown 3 at a prescribed speed or faster, for example, the display changes at the second revolution as shown in FIG. 7 (at the timing when the power generation display mode goes from L to H in FIG. 7). More specifically, because the crown cannot be turned continuously when the user rotates the crown 3, the crown 3 turns intermittently and the generated current rises and falls with each revolution. Detecting the current generated in this case at the prescribed sampling time results in the rectifier circuit output as shown in the first row in FIG. 7.

When the power generation display mode is entered the power generation display controller 9 sets the not-generating display position, which is the second target position noted above, to the initial value 0 (zero graduation 321A), and then executes the power generation display process.

In the power generation display mode the power generation display controller 9 causes the integrator 8 to calculate the amount of power generated since the power generation display mode was entered, and determines if the resulting integral is greater than a predefined threshold value Q2.

The power generation display controller 9 determines if the not-generating display position is set to the maximum graduation on the dial (the tenth graduation 321B in this embodiment of the invention). If the not-generating display position is not set to the maximum graduation, the not-generating display position is incremented by 1, and the integral calculated by the integrator 8 since entering the power generation display mode is reset.

As a result, each time generator output (charge) exceeds Q2 after entering the power generation display mode, the not-generating display position (the graduation indicated by the hand) is incremented one graduation until it reaches the maximum hand position 10 on the dial (the tenth graduation in this embodiment of the invention).

If the charge current is greater than or equal to I2 in the power generation display mode, the power generation display controller 9 moves the display hand 31 forward, that is, in the direction from the zero graduation 321A toward the tenth graduation 321B, that is, the first target position. If the charge current is less than I2, the power generation display controller 9 moves the display hand 31 in reverse, that is, in the opposite direction toward the second target position.

The power generation display mode continues until the charge current is less than I1 continuously for a prescribed time t2 or longer. If the charge current is less than I1 continuously for a prescribed time t2 or longer, the power generation display controller 9 exits the power generation display mode and returns to the operating time display mode.

As described above, the display hand 31 changes from displaying the continuous operating time to displaying power generation when power is generated for a sustained period of time as a result of manually winding the crown 3. In the power generation display mode the power generation display controller 9 moves the display hand 31 according to the generation state, or more specifically according to the charge current level indicated by the detection result signal from the current detector 6, and the user can therefore verify power generation from the movement of the display hand 31.

Because the display hand 31 is at the not-generating display position (=0) immediately after generation starts, the display hand 31 swings between the zero graduation 321A and the tenth graduation 321B according to the power generation state.

The not-generating display position is also incremented (moved toward the 10 on the dial) according to the integral of power generation after the power generation display mode is entered. The position to which the display hand 31 returns when power generation is displayed therefore gradually rises along the scale, and the user can visually know how much the battery has been currently charged by manual winding. For example, if the integral of power generation is greater than or equal to (Q2×4) and less than (Q2×5), the not-generating display position is at the fourth graduation, and the display hand 31 therefore swings between the fourth graduation and the tenth graduation. As integration of the generated power continues, the not-generating display position is incremented one graduation at a time. When the not-generating display position reaches the tenth graduation, the display hand 31 stops swinging and remains stationary at the tenth graduation. This indicates that the battery has been charged an amount equal to a prescribed continuous operating time, such as one day.

The speed at which the display hand 31 is driven can be the same in both forward and reverse directions. However, the power generation display controller 9 and power generation display motor driver 10 in this embodiment of the invention drive the power generation display motor 11 by applying a 128-Hz drive pulse when moving the display hand 31 forward, and drive the power generation display motor 11 by applying a 64-Hz drive pulse when the display hand 31 moves in reverse. The speed of the display hand 31 when moving forward is therefore twice the speed of the display hand 31 when moving in reverse.

When the user stops winding the crown 3 to manually generate power, or more specifically when the charge current level is I1 or less continuously for a predefined time t2 or longer, the operating time display mode is resumed. If manual winding has produced a charge equivalent to at least one day, the continuous operating time display is also incremented one graduation.

Because the battery voltage control process shown in FIG. 8 runs simultaneously with power generation as described above, the secondary battery 7 is discharged appropriately by means of the motor drive pulse or the charge discharger 73 if the power generating operation causes the battery voltage of the secondary battery 7 to rise to or above the first setting, and the voltage increase in the secondary battery 7 is thereby suppressed. Because charging the secondary battery 7 continues during this discharge process if the limiter 72 is not operating, the secondary battery 7 can be sufficiently charged and the power generation display process of the display hand 31 continues normally.

However, if generator current becomes extremely high because the user wound the crown 3 very quickly, for example, causing the voltage of the secondary battery 7 to rise to the second setting (2.2 V) even though current was being discharged by the charge discharger 73 or through the motor drive pulse, the limiter 72 operates to prevent overcharging.

The invention described above has the following effects.

(1) When the battery voltage detector 71 detects the secondary battery 7 voltage and the detected voltage is greater than or equal to a first setting (1.5 V), voltage is discharged by the discharge process of the battery voltage controller 74 and the secondary battery 7 voltage can be prevented from rising. As a result, fluctuation in the drive voltage of the motor driver 10, 15 that are driven by the secondary battery 7, that is, the motors 11, 16, can be minimized and the motors 11, 16 can be driven stably.

(2) When the secondary battery 7 voltage goes to the first setting (1.5 V), the battery voltage controller 74 controls the motor driver 10, 15 and raises the energy level of the motor drive pulses relative to the normal energy level to discharge the secondary battery 7 charge. A separate special discharge circuit is therefore not needed to discharge the secondary battery 7, and the secondary battery 7 charge can be effectively used to drive the motor while discharging the secondary battery 7.

(3) Because the battery voltage controller 74 drives the charge discharger 73 to discharge the secondary battery 7 when the secondary battery 7 voltage goes to the second setting (1.7 V), the discharge capacity can be easily set by setting the resistance of the discharge resistance 732. The discharge capacity can therefore be increased more easily than when the battery is discharged using the motor drive pulse.

The circuit design is also simplified because the charge discharger 73 can be rendered using a discharge transistor 731 and a discharge resistance 732.

(4) The battery voltage controller 74 operates the limiter 72 to prevent further charging the secondary battery 7 when the secondary battery 7 voltage rises to a third setting (2.2 V) so that when power generation exceeds the discharge capacity due, for example, to rapid power generation, overcharging the secondary battery 7 can be reliably prevented.

(5) Because the first setting is set to a voltage that is approximately 90% to 95% of the maximum rated capacity of the secondary battery 7, the entire battery capacity range where voltage fluctuation is small and substantially flat can be used, and the secondary battery 7 can supply a stable output voltage for a long time.

(6) Furthermore, because the second setting (2.2 V) is set to a voltage that is greater than the first setting (1.5 V) by the apparent voltage rise (0.6 V) or more, the limiter 72 is prevented from operating even when an apparent voltage rise of approximately 0.6 V is detected as a result of rapid power generation boosting the charge current or the internal resistance of the secondary battery 7 rising due to a temperature change or long-term use.

The limiter 72 therefore does not operate during rapid charging due to manual power generation by the user, and the secondary battery 7 can be sufficiently charged.

Furthermore, the charge current cannot be detected and the power generation display will therefore stop if the limiter 72 operates when in the power generation display mode of the power generation display controller 9. However, by preventing operation of the limiter 72 as described above, this embodiment of the invention enables the power generation display function to operate normally.

(7) Because the electronic timepiece 1 has a display hand 31 that moves according to power generation (current generation) detected by the current detector 6, and a power generation display including a power generation display controller 9 that controls driving the display hand 31, a power generation display motor driver 10, and a power generation display motor 11, the user can confirm power generation by the generator 4 in real time. The user can therefore confirm if power generation is sufficient during manual power generation, the user can manually operate the power generator while confirming the power generation state, and power can be reliably generated manually.

(8) Both the time and power generation status can be displayed simultaneously because power generation is displayed using a display hand 31 that is separate from the hands 20 for displaying the time. This improves usability and convenience compared with an arrangement in which the time display hands 20 are also used to display the power generation status.

Furthermore, because power generation can be indicated using the display hand 31, power generation can be displayed visually and in real-time similarly to a tachometer, and the user can visually and easily determine the power generation status.

(9) Because the power generation display controller 9 integrates power generation after entering the power generation display mode and increments the not-generating display position one graduation each time power generation reaches Q2, the user can substantially simultaneously determine from the same display hand 31 both the instantaneous power generation state and how much power (charge) has been generated since the power generation display mode started, thus improving convenience.

(10) The power generation display controller 9 normally displays the remaining operating time and switches to the power generation display mode when generating power. Information with a strong mutual correlation can thus be displayed using the same display hand 31, and the electronic timepiece 1 user can get the desired information easily. Furthermore, by using the display hand 31 to display different information, it is not necessary to increase the number of hands or motors, and the arrangement of the electronic timepiece 1 can be simplified.

Furthermore, because the remaining continuous operating time is normally displayed, the user can know approximately how long the electronic timepiece 1 can continue operating without charging, and power can be generated to charge the battery before the timepiece stops. The electronic timepiece 1 can thus be prevented from stopping.

The invention is not limited to the embodiment described above, and variations and modifications achieving the same object are included in the scope of the present invention.

For example, the current detector 6 can be rendered with a capacitor connected parallel to the resistor 61, and used to detect the average charge current. This arrangement integrates and averages the charge current by means of the capacitor, and can therefore detect how much the secondary battery 7 is charged per unit time by means of a simple process.

Discharge unit using two different methods, one using the motor drive pulse and one using the charge discharger 73, are used as the discharge unit in this embodiment of the invention, but either discharge unit could be used alone.

Further alternatively, the battery voltage controller 74 could apply control that operates the charge discharger 73 at the first setting and increases the energy level of the motor drive pulse at the third setting.

More specifically, the discharge unit is not limited to the means described above, and any means of discharging the secondary battery 7 and lowering the battery voltage can be used.

For example, in a digital timepiece that has a liquid crystal display, the motor drive pulse cannot be used to discharge the battery because there is no motor. In this case a discharge unit that drives the display in a discharge mode to consume the secondary battery 7 charge and lower the voltage could be used.

The generator 40 is also not limited to a manual winding generator or a self-winding generator as described above, and various other types of generators can be used, including a generator that operates using an external AC field, a solar generator, and a thermoelectric generator. In addition, the electronic timepiece 1 could incorporate a single type of generator or plural different types of generator assemblies as in the foregoing embodiment.

The electronic timepiece 1 of the invention is also not limited to having hands 20, and could be timepiece having a liquid crystal display, an organic electroluminescent display, an electrophoretic display, or other type of display panel.

The invention is also not limited to use in a wristwatch, and can be used in other types of timepieces having an internal generator, including pocket watches, table clocks, and wall clocks.

More specifically, the invention can be widely used in electronic timepieces that have a generator function and a discharge unit that can discharge the charge stored in a storage unit.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An electronic timepiece with a generator function, comprising:
    a generator;
    a storage unit that stores electrical energy produced by the generator;
    a timekeeping controller that is driven by the electrical energy stored in the storage unit;
    a time display that is controlled by the timekeeping controller and displays time;
    a voltage detector that detects the voltage of the storage unit;
    a discharge unit that discharges the charge stored in the storage unit when the voltage of the storage unit detected by the voltage detector reaches a preset first setting; and
    an overcharge protection unit that prevents the electrical energy produced by the generator from charging the storage unit when the voltage of the storage unit detected by the voltage detector reaches a second setting that is set higher than the first setting.

2. The electronic timepiece with a generator function described in claim 1, wherein:
    the time display has a motor drive circuit and a motor that is driven by a motor drive pulse output from the motor drive circuit;
    the discharge unit has a battery voltage controller that controls the motor drive circuit; and
    the battery voltage controller can discharge the charge stored in the storage unit by outputting the motor drive pulse at a higher energy level than during normal drive.

3. The electronic timepiece with a generator function described in claim 1, wherein:
    the discharge unit includes a charge discharging circuit parallel connected to the storage unit, and a battery voltage controller that controls operation of the charge discharging circuit; and
    the battery voltage controller can cause the charge discharging circuit to operate so that the charge stored in the storage unit passes through the charge discharging circuit and discharges.

4. The electronic timepiece with a generator function described in claim 1, wherein:
    the time display has a motor drive circuit and a motor that is driven by a motor drive pulse output from the motor drive circuit;
    the discharge unit includes a charge discharging circuit parallel connected to the storage unit, and a battery voltage controller; and
    the battery voltage controller controls the motor drive circuit and discharges the charge stored in the storage unit by outputting the motor drive pulse at a higher energy level than during normal drive when the voltage of the storage unit detected by the voltage detector reaches a first setting, and
    causes the charge discharging circuit to operate so that the charge stored in the storage unit passes through the charge discharging circuit and discharges when the storage unit voltage detected by the voltage detector reaches a third setting that is set higher than the first setting.

5. The electronic timepiece with a generator function described in claim 1, wherein:
    the discharge unit increases the discharge level as the voltage of the storage unit rises when the voltage of the storage unit detected by the voltage detector is greater than a first setting.

6. The electronic timepiece with a generator function described in claim 1, further comprising:
    a power generation detector that detects the generation state of the generator; and
    a power generation display that displays the power generation state based on a detection result from the power generation detector.

* * * * *